(12) United States Patent
Parzl et al.

(10) Patent No.: US 7,538,892 B2
(45) Date of Patent: May 26, 2009

(54) METHOD AND APPARATUS FOR EXAMINING END FACES OF LIGHT GUIDES

(75) Inventors: Ernst Parzl, Dingolfing (DE); Johann Piegendorfer, Altfraunhofen (DE); Martin Zöttl, Tiefenbach (DE)

(73) Assignee: Schott AG, Mainz (DE)

( * ) Notice: Subject to any disclaimer, the term of this patent is extended or adjusted under 35 U.S.C. 154(b) by 150 days.

(21) Appl. No.: 11/748,931

(22) Filed: May 15, 2007

(65) Prior Publication Data

US 2008/0049216 A1     Feb. 28, 2008

(30) Foreign Application Priority Data

May 20, 2006 (DE) ......... 10 2006 023 828

(51) Int. Cl.
*G01B 11/30* (2006.01)
(52) U.S. Cl. ..................................... 356/600
(58) Field of Classification Search ........... 356/600
See application file for complete search history.

(56) References Cited

U.S. PATENT DOCUMENTS

| | | | |
|---|---|---|---|
| 4,882,497 A | 11/1989 | Inoue et al. | |
| 5,179,419 A | 1/1993 | Palmquist et al. | |
| 5,937,521 A * | 8/1999 | March et al. | ............ 29/897.34 |
| 6,822,745 B2 | 11/2004 | DeGroot et al. | |

FOREIGN PATENT DOCUMENTS

| | | |
|---|---|---|
| EP | 0 984 259 A1 | 3/2000 |
| WO | 03/052348 A1 | 6/2003 |
| WO | 2005/100943 A1 | 10/2005 |

* cited by examiner

*Primary Examiner*—Roy Punnoose
(74) *Attorney, Agent, or Firm*—DeMont & Breyer LLC

(57) ABSTRACT

In order to provide light guides, in particular in the form of glass rod portions, with improved end faces, the invention provides a method for examining glass rods, in particular light guides, in which the glass rods are arranged in front of two cameras, the cameras recording the end faces from the sides, in two different radial viewing directions with respect to the longitudinal axis of the glass rods, and the planarity and angularity of the contour of the end faces being optically and contactlessly determined with both cameras on the basis of the recordings, and a glass rod automatically being rejected and/or sorted by means of a rejecting/sorting device if there is any deviation of the planarity or angularity of the end faces of the glass rod from a respectively prescribed set range.

35 Claims, 5 Drawing Sheets

METHOD AND APPARATUS FOR EXAMINING END FACES OF LIGHT GUIDES

FIELD OF THE INVENTION

The invention relates generally to the production of light guides. In particular, the invention relates to the examination of end faces of light guides.

BACKGROUND OF THE INVENTION

Light guides are used not only for telecommunications, to transmit data signals over long distances, but also for a wide variety of lighting purposes or for coupling light in and out in optoelectronic components.

In order to produce portions of glass rods for light guides, it is known for portions first to be produced by scoring and breaking. During this scored breaking, however, under some circumstances end faces that are not parallel, and not perpendicular to the optical axis, may be created. It is also possible under some circumstances for variations in length to occur. The latter is also disadvantageous in particular in the case of shorter light guides in the form of glass rod portions for precision components in which these light guides are used. Under some circumstances, light guides of this kind that are too long or too short are no longer suitable for the intended application, so that there is also the risk in subsequent manufacturing steps of producing rejected items.

However, it is in fact generally possible by means of scored breaking to produce end faces of very good quality which, with great parallelism and planarity of the surface, have only low absorption. It would therefore be desirable to be able to use this method for the production of light guides and at the same time improve the uniformity of the light guides produced.

SUMMARY OF THE INVENTION

The invention is therefore based on the object of providing light guides, in particular in the form of glass rod portions, with improved end faces without significantly increasing the production costs.

This object is already achieved in a surprisingly simple way by the subject matter of the independent claims. Advantageous refinements and developments of the invention are specified in the respective dependent claims.

The invention is based on the idea not of improving the production of glass rod portions, in particular for light guides, themselves with regard to the accuracy and precision of the end faces, but of being able to detect and sort and/or reject the generally only few glass rod portions that are defective or of poorer quality, as may occur in particular when cutting them off by scored breaking. In this way, there is no longer any need for cost-intensive reworking, such as for instance cutting to length, grinding and polishing the ends of the rods, in order to meet the requirements demanded with respect to the distance apart, parallelism and planarity of the end faces.

For this purpose, a method is provided for examining glass rods, in particular light guides, in which the glass rods are arranged in front of two cameras, the cameras recording the end faces of the glass rods from the sides, in two different radial viewing directions with respect to the longitudinal axis of the glass rods, and the planarity and angularity of the contour of the end faces being optically and contactlessly determined with both cameras on the basis of the recordings, and a glass rod automatically being rejected and/or sorted by means of a rejecting/sorting device if there is any deviation of the planarity or angularity of the end faces of the glass rod from a respectively prescribed set range.

The recording of the images and determining of the planarity and angularity, and of any other further parameters for characterizing the quality of the glass rods, is in this case performed with particular preference fully automatically, in order to achieve a high throughput.

For carrying out the method, the invention also provides an apparatus for examining glass rods, in particular light guides, which accordingly comprises two cameras and a device allowing the glass rods to be arranged in front of the two cameras in such a way that the cameras view the end faces from the sides, in two different radial viewing directions with respect to the longitudinal axis of the glass rods, the apparatus comprising an image processing system, with which the planarity and angularity of the contour of the end faces is optically and contactlessly determined with both cameras on the basis of the recordings, and the apparatus having a rejecting/sorting device, with which a glass rod is rejected and/or sorted if there is any deviation of the planarity or angularity of the end faces of the glass rod from a respectively prescribed set range. In particular, it is expedient in this case to arrange the cameras with viewing directions, or optical axes, that are at right angles to each other.

For the purposes of the invention, it is also of course not intended for contactless measurement to mean that the glass rods have no contact with other parts of the apparatus. It is merely intended to make it clear that the end faces are not touched on account of the measurement, as for instance in the case of a tracing stylus method.

Furthermore, angularity is understood as meaning the deviation from a plane or surface that is perpendicular to the longitudinal axis. This angularity may be determined or specified in particular as a length, it being possible in this case for the angularity to be specified as a dimension corresponding to the maximum distance of the end face from a plane or surface perpendicular to the longitudinal axis, the plane or surface touching the end face, or lying against it.

Planarity is understood in particular as meaning a form deviation of the first and/or second order as defined by DIN 4760. The planarity may likewise be determined as a distance, it being possible to determine a dimension corresponding to the maximum distance of the surface of the end face from an imaginary planar surface that lies on the end face.

To determine the angularity or planarity of an end face, a line perpendicular to the contour, determined from the recordings, of the lateral surface of the glass rod may be determined as a reference and the deviation of the contour of the end face from this line determined. Such a perpendicular line can be calculated from the recordings with very great accuracy, since the position and shape of the lateral surface of the generally cylindrical glass rods can be extracted from the contour, likewise with very great accuracy, which even exceeds the resolution of the respective camera.

A simple determination of the angularity and/or planarity can also be performed by means of a matching of lines to the contours of the end faces. For instance, to determine the planarity, firstly such a line may be matched to the contour of the end face and the maximum deviations of the contour from this line determined. The difference between the maximum positive and negative deviations can then be used as a measure of the planarity. If the image processing system then detects that this dimension exceeds a predetermined value, for example a set range defined by this limit value, the glass rod is then rejected and/or sorted by means of the rejecting/sorting device.

By means of the two cameras, which view the contour of an end face from two different directions, in particular with preference offset by 90°, an end face can be characterized completely with regard to its planarity and angularity, irrespective of the direction of the runout. For this purpose, it is also possible in particular for the planarity and angularity of the end faces to be calculated by calculating the values determined from the recordings for the planarities and angularities of the two contours respectively of an end face. If, for example, the direction of inclination of the angularity lies between the viewing directions of the cameras, the values for the angularity of the contour from the two recordings of the cameras would respectively give values that are too low for the angularity of the end face. However, the actual angularity of the surface can be calculated back from the contours of the recordings of the two cameras, or their angularity. To determine the planarity of the end face, furthermore, the maximum deviation from a reference line matched to the contour can be determined respectively for both cameras, or their viewing directions, and then the greater of the two values used for comparison with the prescribed set value or set range.

The images of the cameras may also be used for the determination of further measured variables for characterizing the glass rods. For example, with the image processing system, the length of the glass rods can be determined with at least one of the cameras. Furthermore, from the recordings of the cameras, the lengths of the contour lines of the circumference can be determined in the recordings and differences in length determined from the specific lengths at the edge lines.

It is similarly possible to determine diameters of the glass rods with at least one of the cameras on the basis of the recorded contours. A comparison of the diameter values obtained from images of the two cameras may also provide a measure of an elliptical deformation of the glass rods. Furthermore, the curvature, or the straightness, of the glass rods can also be inspected. This value indicates the deviation of the center axis of the optical waveguide from an ideal straight center axis.

In addition, further measurements and examinations of the glass rods can also be performed. In particular, according to one development of the invention, measurement of the light transmission through the glass rods by means of a suitable device. Since the light transmission through the rod portions will generally be very good, a measuring device with which light is repeatedly transmitted through the glass rod is particularly suitable. For this purpose, a light loop, preferably a fiber loop, may be provided, for example, in order to delay light pulses, and a suitable light switching device, which can switch light between different directions, may be provided in order to couple the pulses passing through the light loop back into the glass rod. For example, acousto-optic switches are suitable for this.

A further possible characterization of the quality of the glass rods is the determination of the surface roughness of the end faces. Such a measurement may be performed for example by means of a white-light interferometer or by means of laser scanning by a laser scanning system.

According to a particularly preferred embodiment of the invention, a transporting device is provided for the glass rods. With this transporting device, the glass rods are transported one after the other from a pick-up position to at least one measuring position.

Furthermore, it is preferred to transport the glass rods on a carousel along a circular transporting path. By means of a carousel, a particularly compact inspection apparatus can be realized.

In order to pick up the glass rods, mechanical grippers could be used. To achieve greatest accuracy in the examination of the glass rods, however, it has proven to be particularly favorable if the glass rods are picked up from a depository by means of a sucker. Accordingly, the apparatus according to this development of the invention is equipped with at least one suction gripper, preferably a multiplicity of suction grippers, for picking up the glass rods and holding them during the examination. Picking up and holding the glass rods in this way by means of suction reduces vibrations and therefore results in more exact examination.

Likewise proven to be particularly advantageous for this purpose is a linear servo drive for the transporting device. Such a drive is used with particular preference also in the case of a carousel. In this case, the linear servo drive runs along a circle around the point of rotation. Such a linear servo drive permits extremely exact positioning of the glass rods in front of or in the measuring device or devices. The positioning is performed in this case with preference on a carousel with an angular accuracy of at least $5 \cdot 10^{-3}$ degrees, preferably at least $1 \cdot 10^{-3}$ degrees. With respect to the position of the glass rods, with such angular accuracy it is possible to achieve a positioning accuracy of better than 10 micrometers, preferably of better than 6 micrometers.

Furthermore, the apparatus may also have a number of depositories and a rejecting/sorting device, which is set up for rejecting glass rods that have a deviation of a dimension from a prescribed set range and, depending on the type of deviation, sorting them into various depositories. For example, glass rods that have a deviation of a dimension from a prescribed set range may be rejected and, depending on the type of deviation, sorted into various depositories in order to perform sorting into various quality categories. The glass rods sorted in this way and divided into various classes may be used to optimize the operation of producing the glass rods.

BRIEF DESCRIPTION OF THE DRAWINGS

The invention is explained more precisely and in greater detail below on the basis of preferred exemplary embodiments and with reference to the accompanying drawings, in which the same designations refer to the same or similar parts and in which.

DETAILED DESCRIPTION

Figure 1:
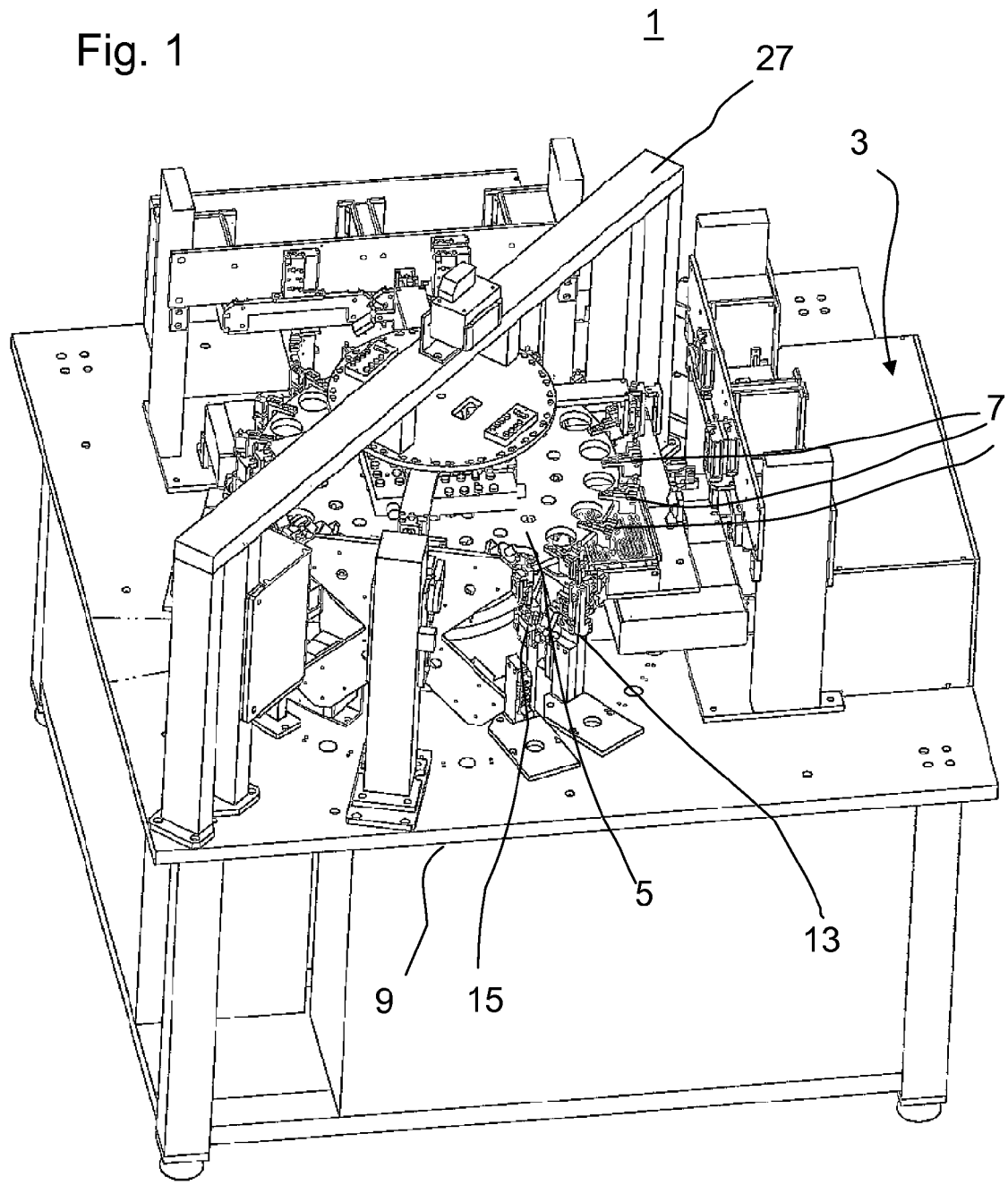
FIG. 1 shows a perspective view.
Figure 2:
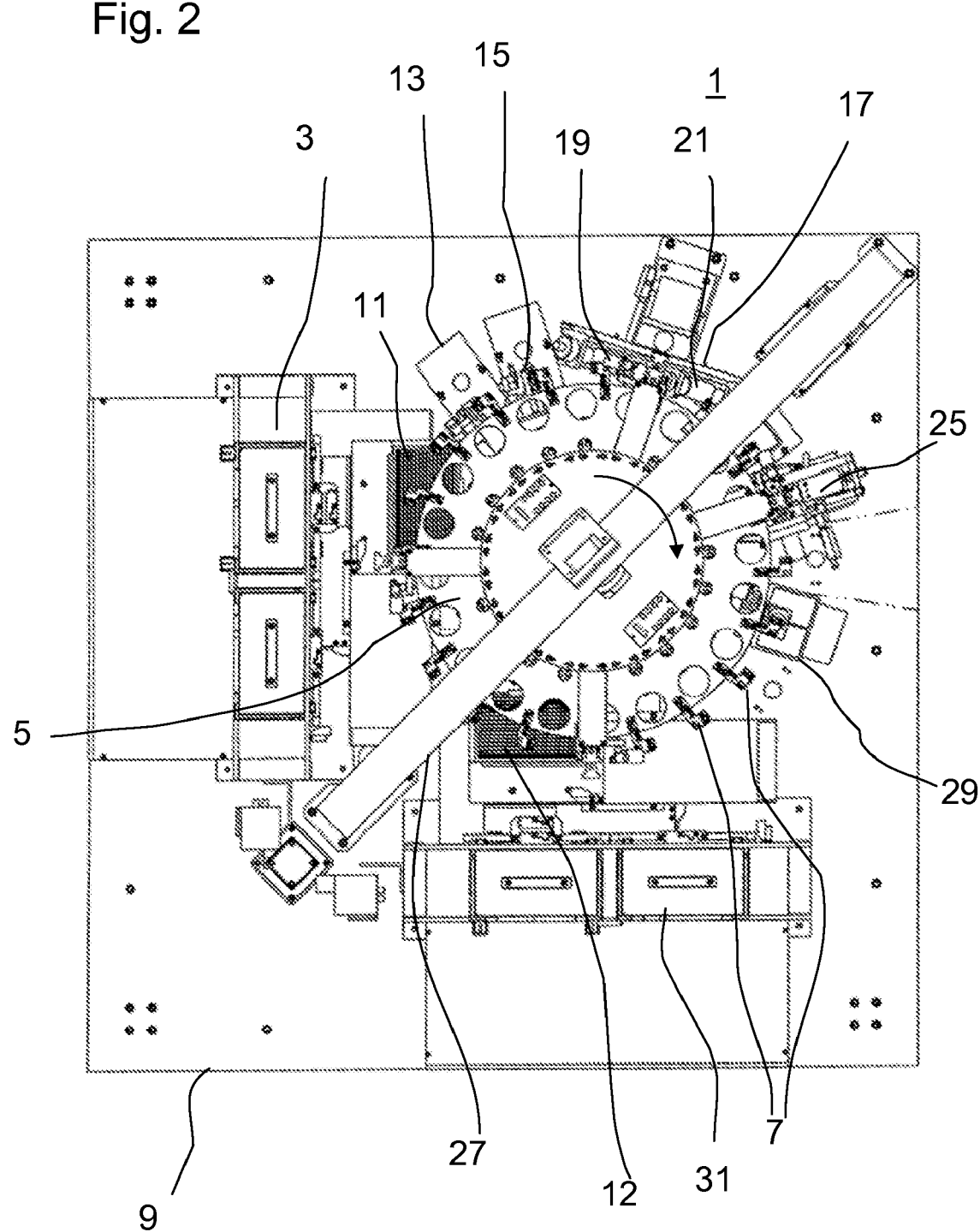
FIG. 2 shows a plan view of an apparatus for examining glass rods.

FIGS. 1 and 2 show an apparatus 1 for examining glass rods which have been cut off from a longer glass rod by scoring and breaking. The apparatus 1 comprises a transporting device, which is mounted on a table 9 and with which the glass rods are transported one after the other from a pick-up position to at least one measuring position. In the case of the exemplary embodiment shown in FIGS. 1 and 2, the transporting device here comprises a carousel 5, with which the glass rods are transported along a circular transporting path. In order to hold the glass rods on the carousel, suction grippers 7 fastened to the carousel 5 are provided for this purpose. The suction grippers thereby grip the glass rods with preference in such a way that the longitudinal axis of the latter lies radially in relation to the axis of rotation of the carousel.

The glass rods to be inspected are deposited on trays 11, which are placed in a magazine 3. The trays 11 have for this purpose a multiplicity of parallel grooves, in which the glass rods lie. The trays are guided by means of a feeding device, which in the example shown has a device for moving in two horizontal directions, one after the other under the suction grippers and further moved there, so that in each case a glass rod is positioned under one of the suction grippers 7 rotating past on the carousel 5 and is picked up by said gripper.

The glass rods held on the suction grippers 7 are then guided past a cleaning unit 13. The cleaning unit 13 cleans glass rods by blowing off dust particles. Next, the glass rods then arrive at an aligning unit 15. This aligning unit 15 aligns the glass rods hanging from the suction grippers in the longitudinal direction, so that the end faces of the glass rods are positioned reproducibly and identically.

Subsequently, the glass rods are respectively guided by the carousel past a camera unit 17 with two cameras 19, 21. With the cameras 19, 21, images of the end faces are recorded from the sides, in two radial viewing directions at right angles to each other with respect to the longitudinal axis of the glass rods. By means of a higher-level controller which communicates with the apparatus and has an independently operating image processing system, the planarity and angularity of the contour of the end faces are determined on the basis of the recordings of the two cameras, so that an automatic optical and contactless examination of the glass rods is realized. An inspection of the length and the straightness of the optical waveguides is additionally performed on the basis of the recordings.

In addition, the transmission of light through the glass rods is measured by means of a transmission measuring unit 25, which in this example follows the camera unit along the transporting path, for which purpose a so-called Japanese loop is used. In FIG. 1, the transmission measuring unit is concealed by the cross member 27. The cross member 27 serves inter alia for the mounting of the carousel 5.

The apparatus 1 also comprises a rejecting/sorting device for rejecting and/or sorting the defective parts. For this purpose, a container arrangement 29 is provided following the transmission measuring unit 25 along the circular transporting path. This container arrangement 29 has a number of containers, in which a glass rod is automatically rejected and/or sorted if there is any deviation of the planarity and/or angularity of the end faces of the glass rod and/or of the transmission, or the attenuation, from a respectively prescribed set range. Depending on the defect, for this purpose the assigned container is moved under the suction gripper and the glass rod concerned is dropped into this container.

The other glass rods, the values of which for planarity, angularity, straightness, length and transmission lie within the prescribed tolerance ranges, are deposited again on trays 12 corresponding to the trays 11. For this purpose, a tray 12 is positioned under the suction grippers by a moving device, which like the moving device for feeding the glass rods can likewise be moved two-dimensionally, so that the glass rods can be deposited on the tray one after the other, preferably also one next to the other and one behind the other in a two-dimensional arrangement.

Figure 3:
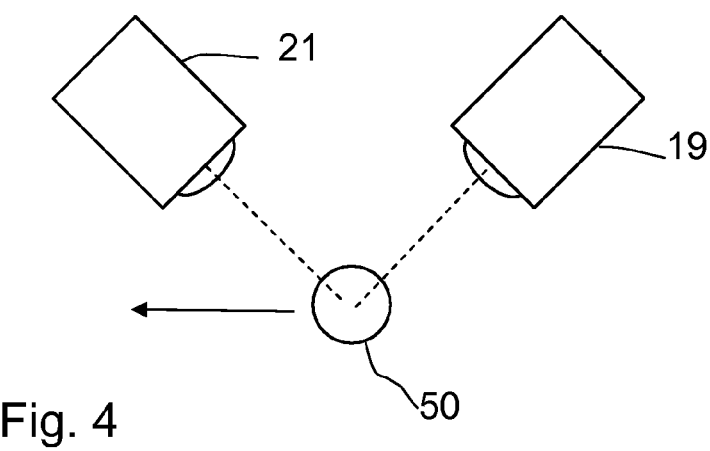
FIG. 3 shows a schematic view of the camera arrangement.

The trays 12 are then buffer-stored in a further magazine 31 and can then be removed, for example for shipping. FIG. 3 shows a schematic view of the camera arrangement of the camera unit 17 with the two cameras 19, 21 and a glass rod 50 to be inspected. The arrangement is represented in FIG. 3 in such a way that the glass rod 50 is shown in plan view of an end face. The direction of advancement of the glass rod 50 by the transporting device (not represented here) is represented by the arrow. As can be seen from FIG. 3, the cameras 19, 21 are arranged in such a way that they respectively view a glass rod 50, positioned in the measuring position, from the sides, in two different radial viewing directions with respect to the longitudinal axis of the glass rod. In particular, the two cameras are arranged in such a way that their viewing directions, or their optical lens axes, are at right angles to each other.

Furthermore, the viewing directions are also arranged obliquely in relation to the direction of advancement, the cameras advantageously looking at the glass rod 50 respectively at an angle of 45°, or 135°, in relation to the direction of advancement in the example shown in FIG. 3.

In the case of a transporting device in the form of a carousel, the cameras 19, 21 are correspondingly also provided at an angle of respectively 45° in relation to the axis of rotation. This arrangement with oblique viewing directions with respect to the direction of advancement or transporting direction is advantageous because the glass rods can be held on the transporting device in such a way that their movement is not hindered by the cameras. For instance, in the case of the arrangement shown in FIG. 3, the glass rods are held by a gripper in such a way that the gripper with the glass rod does not collide with the cameras during the movement of the transporting device.

Figure 4:
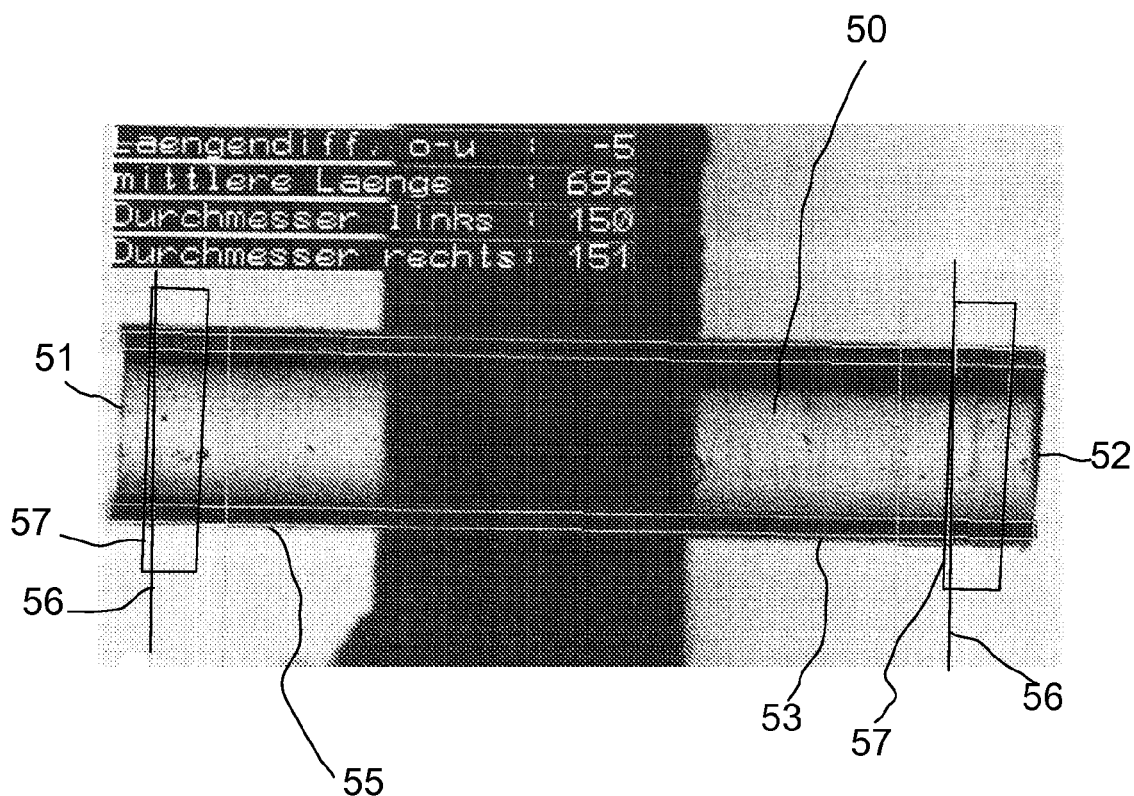
FIG. 4 shows a recording of a glass rod taken with a camera.

FIG. 4 shows a recording of a glass rod 50 with end faces 51, 52 and lateral surface 53 by means of one of the cameras. Measuring data determined by the image processing system on the basis of the recording are superposed in the photo. Specifically, in the case of the glass rod represented, a difference in length of the upper and lower edge lines of the lateral surface 53 of −5 micrometers was determined. The average length of the glass rod 50, determined on the basis of the recording, is 6.92 millimeters and the left and right diameters are 1.5 and 1.51 millimeters.

In order to determine the angularity of the end faces 51, 52, at least one line 55 is first determined as a reference, representing a contour of the lateral surface, and a line 56 perpendicular to it is calculated. Furthermore, lines 57 which represent the best match to the contour of an end face 51, or 52 are determined. The angularity of an end face 51, 52 for the projection of the glass rod 50 that can be seen in the respective image is then obtained from the deviation of the two lines in the longitudinal direction of the glass rod at the location of the contour line of the lateral surface when the two lines are laid one on top of the other in such a way that they intersect at the opposite contour line of the lateral surface.

Figure 5:
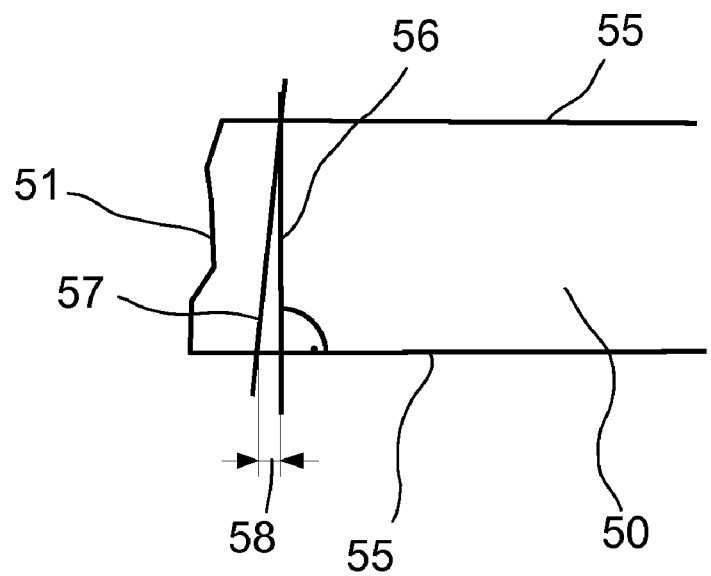
FIG. 5 shows an illustration of the determination of the angularity of an end face of a glass rod.

This method carried out by the correspondingly set up image processing device is once again explained in more detail on the basis of FIG. 5. A line 57 is matched to the contour of the end face 51 of a glass rod 50. In addition, a line 56 perpendicular to the contour 55 of the lateral surface is calculated. To allow them to be better seen, the lines 56, 57 are shown here displaced along the longitudinal axis of the glass rods 50. The two lines 56, 57 are laid one on top of the other in such a way that they cross at one of the two contour lines 55 of the lateral surface. At the point where the lines 56, 57 cross the opposite contour 55, the distance between the two lines 56, 57 is determined. This distance 58 is the angularity determined from the recording concerned for the respective end face, here that is for end face 51.

It goes without saying that the method as outlined on the basis of FIG. 4 does not have to be performed purely graphically. For example, the determination of the angularity may also be carried out purely computationally on the basis of the data for the lines 56, 57, for example by determining the difference between the slopes of the two lines and multiplying this by the diameter of the glass rod 50.

In order to determine a line matched to the contour of the end face 51, it is possible for example to use a match minimizing the mean square distances of the line from the contour points, or the determination of a regression line through the contour points.

Figure 6:
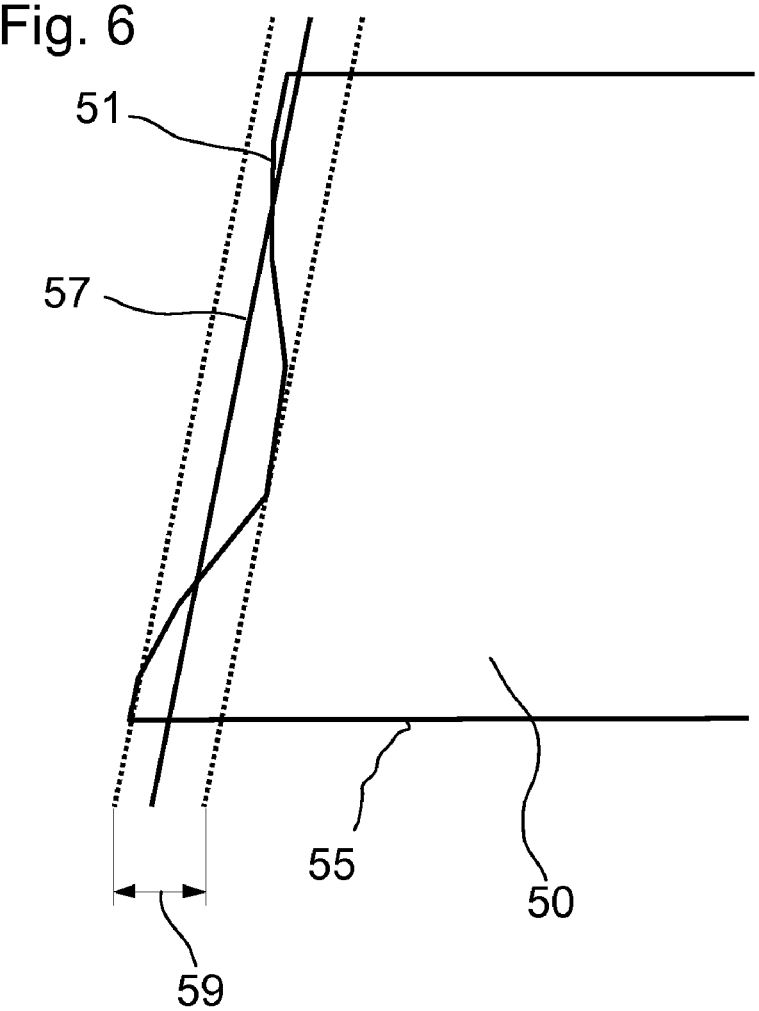
FIG. 6 shows an illustration of the determination of the planarity of a glass rod.

The determination of the planarity is explained in further detail below on the basis of FIG. 6. A line 57 matched to the contour of an end face 51 is also used for determining the planarity of the end face. Subsequently, the maximum distances of the contour points from this line are determined. In the case of the example shown in FIG. 6, line 57 has been placed at the contour in such a way that a best match to the shape of the contour is achieved. Then, the maximum distances of the contour points to both sides of the line are determined. The maximum distances are indicated here in FIG. 6 by the broken lines parallel to line 57. The maximum distances corresponding to the distances of the two broken lines from the line 57 are then added together and give the distance 59, which indicates the planarity of the end face.

Figure 7:
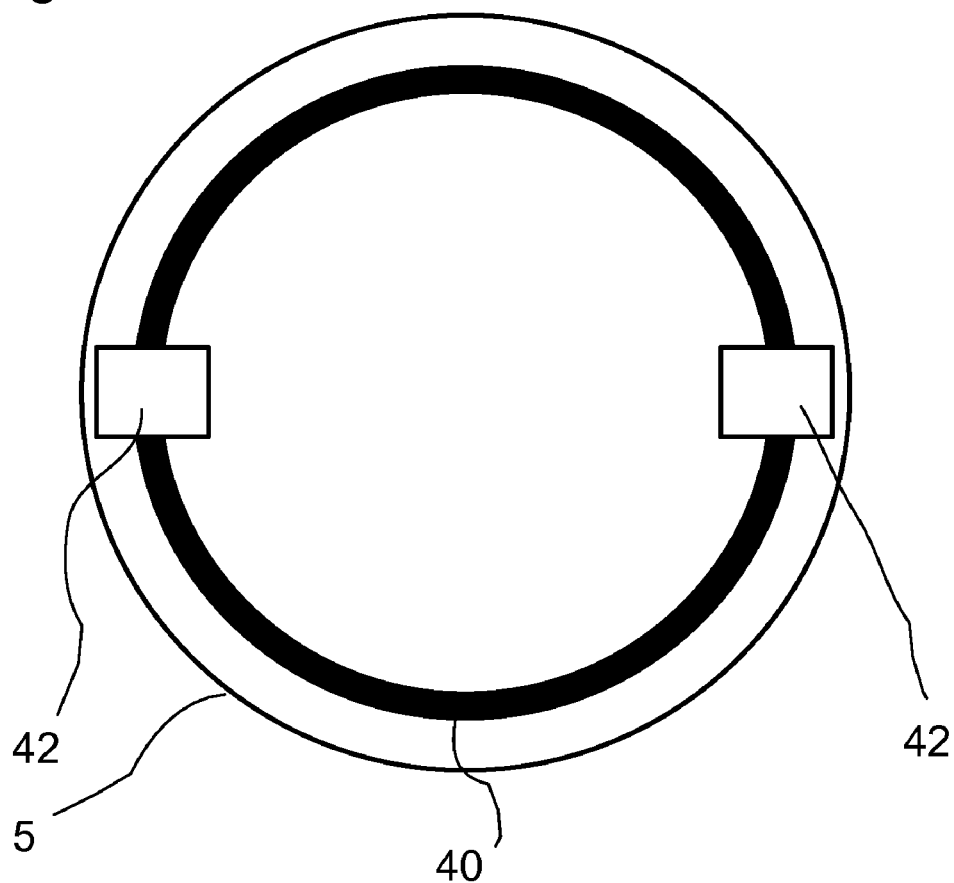
FIG. 7 shows a schematic representation of the linear servo drive of the apparatus shown in FIGS. 1 and 2.

FIG. 7 shows a schematic representation of the linear servo drive of the apparatus shown in FIGS. 1 and 2. The linear servo drive comprises a rotor 40, which extends along a circle that is concentric in relation to the axis of rotation of the carousel. The rotor 40, and consequently the carousel 5, is driven by one or more stators 42. In order to achieve a high torque and great positioning accuracy, the rotor is arranged along a circle with the greatest possible diameter. According to a preferred refinement of a linear motor for an apparatus 1 according to the invention, the motor can be positioned in 614400 different positions. In the case of a carousel with a diameter of approximately 75 centimeters, a positioning accuracy in the circumferential direction of better than 6 micrometers is thereby achieved for the glass rods held at the outer circumference.

The glass rods that are inspected with an apparatus as described above, or by the method carried out with this apparatus, are used for example in optical fiber plug-in connectors. Until now, plastic light guides have usually been used for this. However, in comparison, one of the advantages of glass rods as coupling elements is that they are thermally much more stable and retain their optical properties unchanged even over a long period of time. The light guides are therefore also suitable in particular for optical plug-in connectors for the automobile sector.

Figure 8:
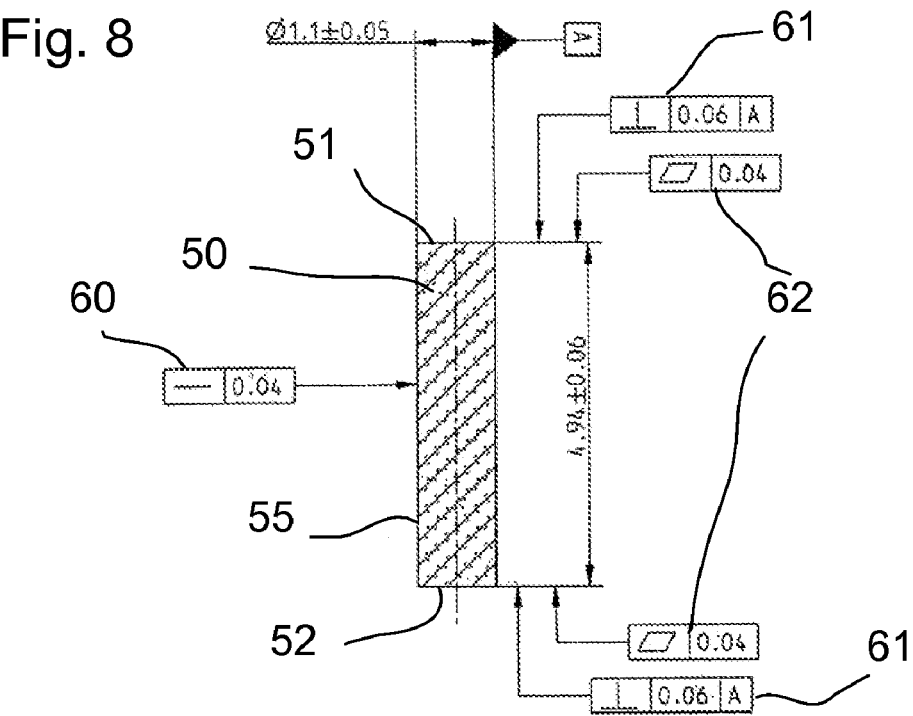
FIG. 8 shows a cross-sectional view of a glass rod with indications of tolerance ranges such as those examined with the apparatus.

FIG. 8 shows such a glass rod 15 with tolerance ranges of various dimensions, on the basis of which rejecting/sorting of defective parts can be performed by means of an apparatus according to the invention.

In the case of this example, rejecting/sorting is performed when there is at least one of the following deviations from a prescribed tolerance range:

a deviation in length from the set dimension of more than 6 micrometers, a deviation of the center line from a straight line according to the tolerance indication 60 of over 4 micrometers (corresponding to a straightness of worse than 4 micrometers or a curvature of greater than 4 micrometers), a deviation of the diameter from the set dimension by more than 5 micrometers, an angularity of one of the end faces 51, 52 according to tolerance indication 61 of over 6 micrometers, and a planarity according to tolerance indication 62 of worse than 4 micrometers.

The transmission or attenuation is not indicated in the case of the example shown in FIG. 8. However, rejecting/sorting is also preferably performed on the basis of a prescribed maximum attenuation, for example at most 0.5 dB for each end face.

It is evident to a person skilled in the art that the invention is not restricted to the embodiments described above by way of example, but can be varied in many diverse ways. In particular, the features of the figures can also be combined with one another.

LIST OF DESIGNATIONS 1 apparatus
3 magazine for carriers
5 carousel
7 suction gripper
9 table
11 tray
13 cleaning unit
15 aligning unit
17 camera unit
19, 21 cameras
25 transmission measuring unit
27 cross member
29 container arrangement
50 glass rod
51, 52 end faces of 50
53 lateral surface of 50
55 contour line of the lateral surface of 50
56 line perpendicular to 55
57 line matched to the contour of 51 of 52
58 angularity
59 planarity
16 tolerance range for curvature
61 tolerance range for angularity
62 tolerance range for planarity

The invention claimed is:

1. A method for examining glass rods, comprising:
   arranging the glass rods in front of two cameras;
   recording, via the two cameras, the end faces of the glass rods from the sides, in two different radial viewing directions with respect to the longitudinal axis of the glass rods;
   optically and contactlessly determining the planarity or angularity of the contour of the end faces with the two cameras on the basis of the recording; and
   performing at least one of rejecting and sorting a glass rod from the glass rods by means of a rejecting/sorting device if there is any deviation of the planarity or angularity of the end faces of the glass rod from a respectively prescribed set range.

2. The method as claimed in claim 1, wherein, to determine the angularity or planarity of an end face, a line perpendicular to the contour, determined from the recordings, of the lateral surface of the glass rod is determined as a reference and the deviation of the contour of the end face from this line determined.

3. The method as claimed in claim 1, wherein, to determine the angularity or planarity, a line is respectively matched to the contour of the end faces.

4. The method as claimed in claim 1, wherein the angularity or planarity of the end faces is determined by means of the two cameras being arranged at right angles to each other.

5. The method as claimed in claim 1, further comprising determining the planarity and angularity of the end faces by calculating the values determined from the recordings of the two cameras for the planarities and angularities of the two contours respectively of an end face.

6. The method as claimed in claim 1, wherein the determining of the planarity comprises the matching of a line to the contour of the end face and the determining of the maximum deviation of the contour from this line.

7. The method as claimed in claim 1, further comprising determining the length of the glass rods with at least one of the two cameras.

8. The method as claimed in claim 7, wherein, from the recordings of the two cameras, the lengths of the contour lines of the circumference are determined in the recordings and differences in length determined from the specific lengths at the edge lines.

9. The method as claimed in claim 1, further comprising determining a curvature of the glass rods on the basis of the image of at least one of the two cameras.

10. The method as claimed in claim 9, wherein diameters of the glass rods are determined with at least one of the two cameras on the basis of the recorded contours.

11. The method as claimed in claim 1, further comprising measuring the light transmission through the glass rods.

12. The method as claimed in claim 1, further comprising measuring the surface roughness of the end faces.

13. The method as claimed in claim 12, wherein the surface roughness is measured by means of a white-light interferometer.

14. The method as claimed in claim 12, wherein the surface roughness is measured by means of laser scanning.

15. The method as claimed in claim 1, further comprising transporting the glass rods by means of a transporting device one after the other from a pick-up position to at least one measuring position.

16. The method as claimed in claim 15, wherein the glass rods are transported on a carousel along a circular transporting path.

17. The method as claimed in claim 16, wherein the glass rods are positioned with the carousel with an angular accuracy of at least $5\times10^{-3}$ degrees for the examination.

18. The method as claimed in claim 15, wherein the transporting device is driven by a linear servo drive.

19. The method as claimed in claim 1, further comprising picking up the glass rods from a depository by means of a sucker.

20. The method as claimed in claim 1, further comprising rejecting glass rods that have a deviation of a dimension from a prescribed set range and, depending on the type of deviation, sorting the rejected glass rods into various depositories.

21. An apparatus for examining glass rods, the apparatus comprising:
two cameras;
a device for arranging the glass rods in front of the two cameras in such a way that the two cameras view the end faces of the glass rods from the sides, in two different radial viewing directions;
an image processing system, with which the planarity and angularity of the contour of the end faces is optically and contactlessly determined with the two cameras on the basis of the recordings; and
a rejecting/sorting device, with which a glass rod is rejected and/or sorted if there is any deviation of the planarity or angularity of the end faces of the glass rod from a respectively prescribed set range.

22. The apparatus as claimed in claim 21, wherein the two cameras are arranged at right angles to each other.

23. The apparatus as claimed in claim 21, wherein the image processing system determines the length of the glass rods with at least one of the two cameras.

24. The apparatus as claimed in claim 21, further comprising a device for measuring the light transmission through the glass rods.

25. The apparatus as claimed in claim 21, further comprising a transporting device for transporting the glass rods one after the other from a pick-up position to at least one measuring position.

26. The apparatus as claimed in claim 25, wherein the glass rods are transported on a carousel along a circular transporting path.

27. The apparatus as claimed in claim 25, wherein the two cameras are arranged with a viewing direction obliquely in relation to the direction of advancement of the transporting device.

28. The apparatus as claimed in claim 25, wherein the transporting device is driven by a linear servo drive.

29. The apparatus as claimed in claim 28, wherein the transporting device comprises a carousel and the linear servo drive is arranged along a circle around the point of rotation.

30. The apparatus as claimed in claim 21, further comprising a transporting device with a carousel with an angular accuracy of the positioning of at least $5\times10^{-3}$ degrees.

31. The apparatus as claimed in claim 21, further comprising at least one suction gripper for picking up and holding the glass rods.

32. The apparatus as claimed in claim 21, further comprising multiple depositories, wherein depending on the type of deviation, the rejecting/sorting device sorts the rejected glass rods into the multiple depositories.

33. The apparatus as claimed in claim 21, further comprising a device for measuring the surface roughness of the end faces.

34. The apparatus as claimed in claim 33, wherein the device for measuring the surface roughness comprises a white-light interferometer.

35. The apparatus as claimed in claim 33, wherein the device for measuring the surface roughness comprises a laser scanning system.

* * * * *